(12) United States Patent
Wang

(10) Patent No.: US 10,838,509 B2
(45) Date of Patent: Nov. 17, 2020

(54) ERGONOMIC KEYBOARD AND PORTABLE COMPUTER

(71) Applicant: Xiguo Wang, Shenzhen (CN)

(72) Inventor: Xiguo Wang, Shenzhen (CN)

( * ) Notice: Subject to any disclaimer, the term of this patent is extended or adjusted under 35 U.S.C. 154(b) by 0 days.

(21) Appl. No.: 16/303,009

(22) PCT Filed: May 12, 2017

(86) PCT No.: PCT/CN2017/084117
§ 371 (c)(1),
(2) Date: Nov. 19, 2018

(87) PCT Pub. No.: WO2017/202217
PCT Pub. Date: Nov. 30, 2017

(65) Prior Publication Data
US 2019/0286246 A1 Sep. 19, 2019

(30) Foreign Application Priority Data

May 25, 2016 (CN) .................... 2016 2 0485783 U

(51) Int. Cl.
G06F 3/02 (2006.01)
G06F 1/16 (2006.01)
G06F 3/023 (2006.01)

(52) U.S. Cl.
CPC .......... *G06F 3/0202* (2013.01); *G06F 1/1616* (2013.01); *G06F 1/1664* (2013.01); *G06F 3/023* (2013.01); *G06F 3/0216* (2013.01)

(58) Field of Classification Search
USPC ........................................ 345/168
See application file for complete search history.

(56) References Cited

U.S. PATENT DOCUMENTS 6,132,118 A * 10/2000 Grezeszak ............ G06F 3/0219
400/472
2014/0198444 A1* 7/2014 Kwok ................... G06F 1/1624
361/679.14

FOREIGN PATENT DOCUMENTS

EP 001569070 * 2/2004 ............... G06F 3/02

* cited by examiner

*Primary Examiner* — Ifedayo B Iluyomade
(74) *Attorney, Agent, or Firm* — Sinorica, LLC

(57) ABSTRACT

A portable computer has a host and a display screen. The host has an ergonomic keyboard. The ergonomic keyboard has a left-hand keypad, a right-hand keypad, a user proximal end and a user distal end. The left-hand keypad has a plurality of first key columns and a plurality of first key rows. The plurality of first key columns are in a first radial arrangement. The right-hand keypad has a plurality of second key columns and a plurality of second key rows. The plurality of second key columns are in a second radial arrangement.

14 Claims, 5 Drawing Sheets

ERGONOMIC KEYBOARD AND PORTABLE COMPUTER

TECHNICAL FIELD

The utility model relates to electric digital data processing, in particular to a manual input device for interaction between a user and a computer.

BACKGROUND ART

The most widely used traditional "QWERTY" standard keyboard is as shown in FIG. 1, the keys controlled by each finger are arranged in a left-up right-down inclined mode, which is opposite to the right-up left-down inclined direction of the fingers when the left hand is naturally placed; and during operation according to the standard keyboard fingering method, the left elbow of a user is forced to be adducted, ulnar deviation of the left wrist and palm has to be caused, and the fingers of the left hand are forced to stretch out frequently, these are the main reasons for fatigue and injury to the muscle groups of the shoulder and wrist, and a user usually gets serious repetitive strain injury (RSI), such as carpal tunnel syndrome (CTS) after tapping the keyboard for a long time.

Many ergonomic keyboard designs suitable for the special angles and structures of human arms, wrists and hands and preferred by users have been provided by now. For example, in the examples of existing ergonomic features, a "fixed split ergonomic" keyboard design is adopted for some keyboards, in which the main alphanumeric keyboard is divided into two parts at an angle to each other, and the angle is consistent with the typical angle formed by the arms and wrists of keyboard users. Examples of this separate design include the Microsoft Natural keyboard (hereinafter referred to as the "natural keyboard" design) shown in FIG. 2 and other products similar to a separate keyboard typing area.

According to the above-mentioned ergonomic keyboard, a left-hand keypad and a right-hand keypad specified by the fingering method are separated from each other on a standard keyboard and a certain angle is formed, so that a user does not have to consciously tighten both arms, and considerable ulnar deviation of the palm is avoided. The keyboard of this design can effectively reduce the wrong hitting rate between the left-hand keypad and the right-hand keypad, such as the letters "G" and "H", for users who are used to touch typing.

However, in the current ergonomic keyboard embodiments, the settings that the left-hand keypad and the right-hand keypad are separated from each other and a certain angle is formed only relieve the tense state of the shoulders and elbows of a user, and the wrist joints are in a natural state when both hands of a user rest on the standard key positions, but the wrist joints, the palm joints and the interphalangeal joints are still in a forced twisted state during typing. As shown in FIG. 2, when both hands are naturally placed on the standard key positions of the keyboard, the long axis of the middle finger and the vertical axis of the keyboard form an angle of 8-15 degrees opened downwards, the long axis of each finger of the left hand is inclined in a right-up left-down direction, while the keys of each column in the left-hand keypad are arranged in a left-up right-down inclined mode. Take the fingering keys e, d and c for the middle finger of the left hand as an example, an angle of 30-40 degrees is formed between the connecting line of the keys e, d and c and the long axis of the middle finger of the left hand, and this setting of keys is bound to cause the palm joints and wrist joints of the left hand to twist to the left greatly and frequently when the middle finger of the left hand hits the keys. Moreover, the parallel arrangement of the keys of each column does not conform to the anatomical feature that natural angles exist between the phalanges of a human palm. Besides, the fingers of both hands are different in length, the connecting line of fingertips is an arc, and when each finger flexes naturally, the fingertip landing points still form an arc; however, the keys of each row in the existing ergonomic keyboard are arranged in a straight line, and to keep this straight line, the middle finger and ring finger are forced to be in an unnatural over-flexed state. In addition, commonly used edit keys are set on two sides and operated by relatively inflexible little fingers, which not only requires considerable ulnar deviation of the little fingers, but also causes every finger of both hands to leave the standard key positions, reducing the input speed and accuracy.

SUMMARY OF THE INVENTION

The above-mentioned prior art fails to effectively solve the problem of forced twisting of wrist joints, palm joints and interphalangeal joints during typing, and in order to improve the input speed and accuracy, the utility model provides an ergonomic keyboard, comprising a left-hand keypad, a right-hand keypad, a user proximal end and a user distal end, and characterized in that the left-hand keypad comprises a plurality of first key columns and a plurality of first key rows, and the plurality of first key columns are in a first radial arrangement; and the right-hand keypad comprises a plurality of second key columns and a plurality of second key rows, and the plurality of second key columns are in a second radial arrangement.

Further, the first radial arrangement is that there is a first included angle between every two first straight lines where the first key columns are located, and the plurality of first straight lines have at least one first intersection point close to the user proximal end of the ergonomic keyboard; and the second radial arrangement is that there is a second included angle between every two second straight lines where the second key columns are located, and the plurality of second straight lines have at least one second intersection point close to the user proximal end of the ergonomic keyboard.

Further, each of the first included angles is 2-8 degrees, and each of the second included angles is 2-8 degrees.

Further, the plurality of first straight lines have a plurality of first intersection points located at the user proximal end of the ergonomic keyboard; and the plurality of second straight lines have a plurality of second intersection points located at the user proximal end of the ergonomic keyboard.

Further, a plurality of third included angles and a plurality of third intersection points are formed between the first straight lines and the second straight lines, and the plurality of third intersection points are located at the user distal end of the ergonomic keyboard.

Further, among the plurality of third included angles, the minimum angle is 10 degrees and the maximum angle is 60 degrees.

Further, at least one of the first key rows is in an arcuate shape arrangement, and the center of the first arcuate shape is located to the left side of the user proximal end;

and at least one of the second key rows is arranged in a second arcuate shape, and the center of the second arcuate shape is located to the right side of the user proximal end.

Further, a plurality of edit keys are provided and arranged between the left-hand keypad and the right-hand keypad.

Further, a numeric keypad is provided and arranged further to the right side of the right-hand keypad.

In addition, the utility model provides a portable computer comprising a host and a display screen pivoted to the host, the host further comprises a keyboard, and the keyboard is an ergonomic keyboard with the above technical features.

Therefore, the utility model has the beneficial effects of providing an ergonomic keyboard and a portable computer, wherein the key columns on the keyboard are arranged in a radial pattern and an included angle exists between every two key columns, conforming to the anatomical feature that natural angles exist between the phalanges of a human palm, so the problem of forced twisting of wrist joints, palm joints and interphalangeal joints during typing can be effectively solved, and the input speed and accuracy can be improved.

Figure 1:
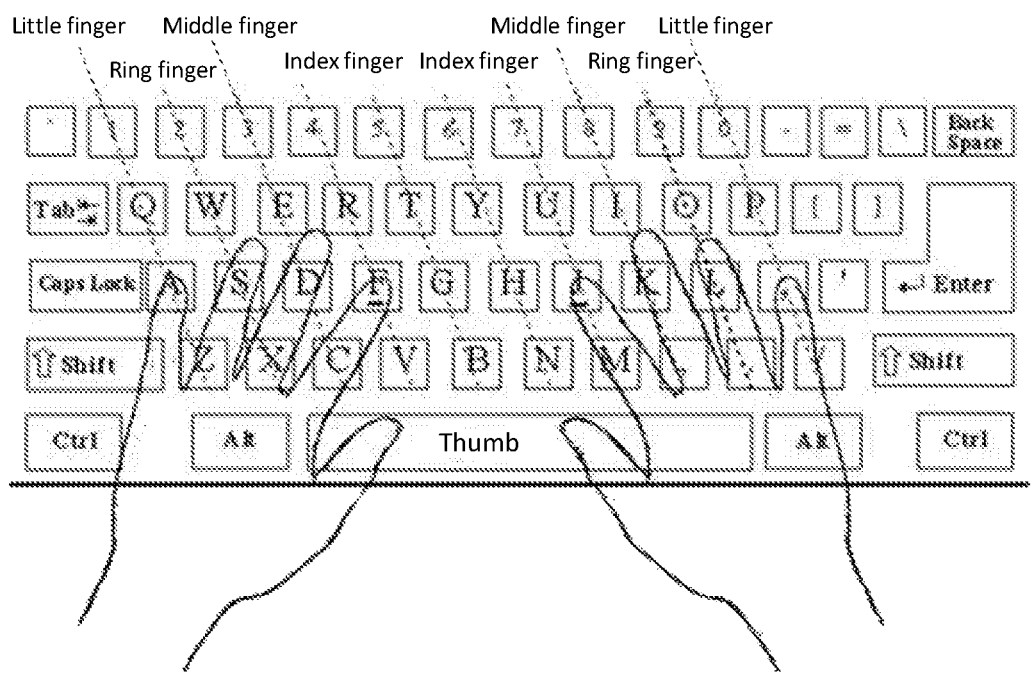
FIG. 1 is a schematic diagram of a standard keyboard fingering method.
Figure 2:
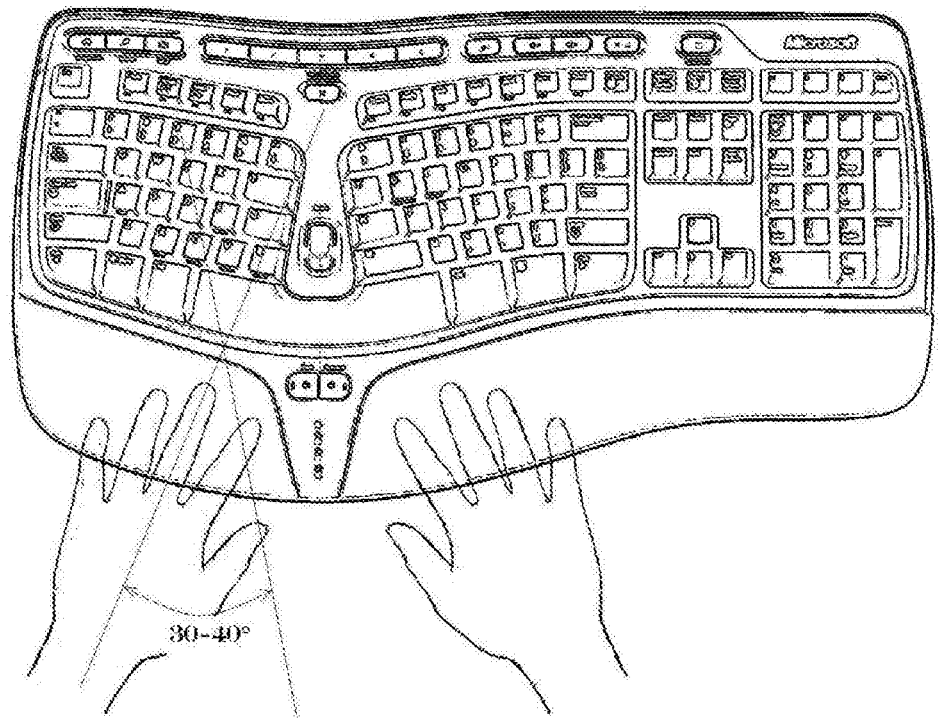
FIG. 2 is a schematic diagram of a Microsoft Natural keyboard.

The reference numerals in the drawings are described as follows:

DESCRIPTION

14 Ergonomic keyboard
10 Left-hand keypad
100 First key column
110 First straight line
120 First intersection point
130 First included angle
140 First key row
190 Right-hand keypad
200 Second straight line
220 Second intersection point
230 Second included angle
240 Second key row
290 User proximal end
300 User distal end
400 Third included angle
410 Third intersection point
420 Numeric keypad
830 Direction keypad
840 Portable computer
900 Host
910 Display screen
920 Keyboard
930 Straight line
L11 Straight line
L12 Straight line
L13 Straight line
L14 Straight line
L15 Straight line
R11 Straight line
R12 Straight line
R13 Straight line
R14 Straight line
R15 Arc
L21 Arc
L22 Arc
L23 Arc
L24 Arc
R21 Arc
R22 Arc
R23 Arc
R24 Arc

DETAILED DESCRIPTION OF THE INVENTION

The utility model mainly discloses an ergonomic keyboard and a portable computer, and it should be noted that the drawings referred to below mainly show structural schematic diagrams related to the features of the exemplary embodiment of the utility model so as to help those skilled in the art understand, and do not need to draw completely according to the actual size.

Figure 3:
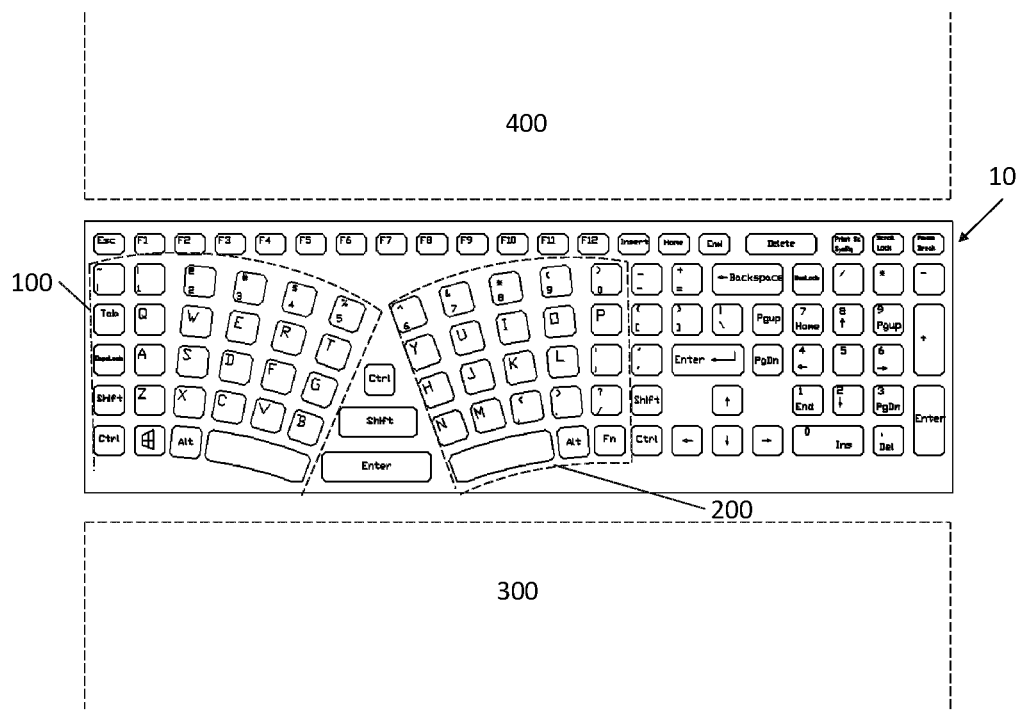
FIG. 3 is a schematic diagram of an ergonomic keyboard according to the utility model.

Referring to FIG. 3, an ergonomic keyboard 10 provided by the utility model comprises a left-hand keypad 100, a right-hand keypad 200, a user proximal end 300 and a user distal end 400.

Figure 4:
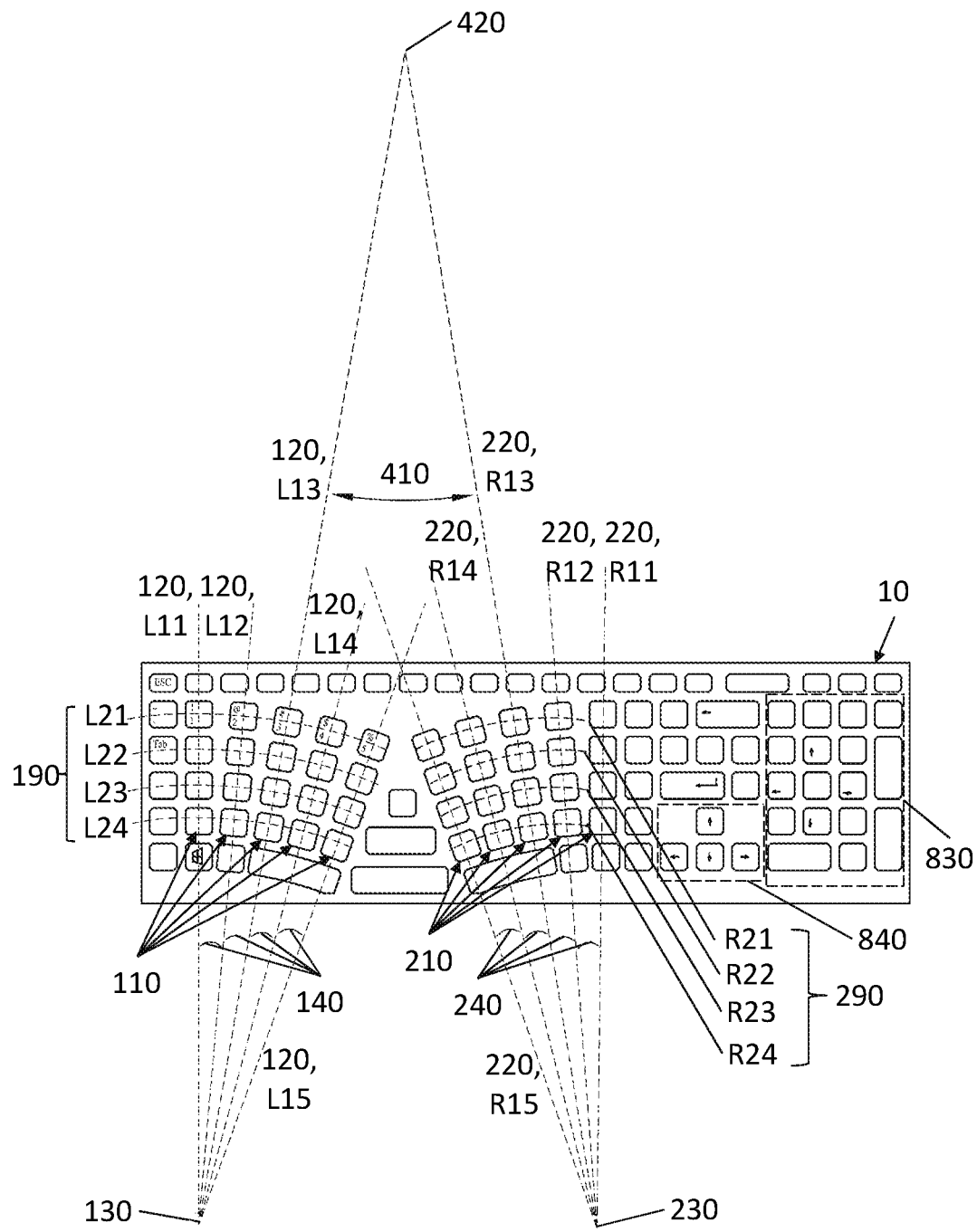
FIG. 4 is a schematic diagram of key arrangement of the ergonomic keyboard according to the utility model.

Referring to FIG. 4 at the same time, a schematic diagram of key arrangement of the ergonomic keyboard of the utility model is shown. The left-hand keypad 100 comprises a plurality of first key columns 110 and a plurality of first key rows 190, the plurality of first key columns 110 are in a first radial arrangement, and the first radial arrangement is formed by first included angles 140 formed between every two first straight lines 120 where the first key columns 110 are located. The first straight lines 120 include a straight line L11, a straight line L12, a straight line L13, a straight line L14 and a straight line L15. In this embodiment, the keys ⌈1⌋, ⌈q⌋, ⌈a⌋ and ⌈z⌋ are arranged along the straight line L11, the keys ⌈2⌋, ⌈w⌋ ⌈s⌋ and ⌈x⌋ are arranged along the straight line L12, the keys ⌈3⌋, ⌈e⌋, ⌈d⌋ and ⌈c⌋ are arranged along the straight line L13, the keys ⌈4⌋ ⌈r⌋, ⌈f⌋ and ⌈v⌋ are arranged along the straight line L14, and the keys ⌈5⌋, ⌈t⌋, ⌈g⌋ and ⌈b⌋ are arranged along the straight line L15; and the straight lines L11-L15 form the aforementioned first radial arrangement, and the included angles formed between the straight lines L11-L15 are the first included angles 140 which are 2-8 degrees.

The plurality of the first straight lines 120 have at least one first intersection point 130 near the user proximal end 300 of the ergonomic keyboard 10, as shown in FIG. 4, the intersection point of the extension lines of the straight lines L11-L15 is the first intersection point 130.

The right-hand keypad 200 comprises a plurality of second key columns 210 and a plurality of second key rows 290, the plurality of second key columns 210 are in a second radial arrangement, and the second radial arrangement is formed by second included angles 240 formed between every two second straight lines 220 where the second key columns 210 are located. The second straight lines 220 include a straight line R11, a straight line RL12, a straight line R13, a straight line R14 and a straight line R15. In this embodiment, the keys [b], [y], ⌈h⌋ and ⌈n⌋ are arranged along the straight line R15, the keys ⌈7⌋, ⌈u⌋, ⌈j⌋ and ⌈m⌋ are arranged along the straight line R14, the keys ⌈8⌋, ⌈i⌋, ⌈k⌋ and ⌈,⌋ are arranged along the straight line R13, the keys ⌈9⌋, ⌈o⌋, ⌈l⌋ and ⌈.⌋ are arranged along the straight line R12, and the keys ⌈o⌋, ⌈p⌋, ⌈;⌋ and ⌈/⌋ are arranged along the straight line R11; and the straight lines R11-R15 form the aforementioned second radial arrangement, and the included angles formed between the straight lines R11-R15 are the second included angles 240 which are 2-8 degrees.

The plurality of second straight lines 220 have at least one second intersection point 230 near the user proximal end 300 of the ergonomic keyboard 10, as shown in FIG. 4, the intersection point of the extension lines of the straight lines R11-R15 is the second intersection point 230.

A plurality of third included angles 410 and a plurality of third intersection points 420 are formed between the plurality of first straight lines 120 and the plurality of second straight lines 220, such as a plurality of third included angles 410 and a plurality of third intersection points 420 formed by the straight line R15 and the straight line L15, the straight line R14 and the straight line L14, the straight line R13 and the straight line L13, and the straight line R12 and the straight line L12 respectively. Among the plurality of third included angles 410, the minimum angle is 10 degrees, the maximum angle is 60 degrees, and the third intersection points 420 are located at the user distal end 400 of the ergonomic keyboard 10.

The first key rows 190 are in an arcuate shape arrangement, and the center of the first arcuate shape is located to the left side of the user proximal end 300. The first key rows 190 include an arc L21, an arc L22, an arc L23 and an arc L24. In this embodiment, the keys ⌈2⌋, ⌈3⌋, ⌈4⌋ and ⌈5⌋ are arranged on the arc L21, the keys ⌈w⌋, ⌊e⌋, ⌊r⌋ and ⌊t⌋ are arranged on the arc L22, the keys ⌊s⌋, ⌈d⌋, ⌈f⌋ and ⌈g⌋ are arranged on the arc L23, the keys ⌈x⌋, ⌊c⌋, ⌈v⌋ and ⌈b⌋ are arranged on the arc L24, and the arcs L21-L24 are arranged in an arcuate shape.

The second key rows 290 are arranged in a second arcuate shape, and the center of the second arcuate shape is located to the right side of the user proximal end 300. The second key rows 290 include an arc R21, an arc R22, an arc R23 and an arc R24. In this embodiment, the keys ⌈6⌋, ⌈7⌋, ⌊8⌋ and ⌈9⌋ are arranged on the arc R21, the keys ⌊y⌋, ⌈u⌋, ⌈i⌋ and ⌈o⌋ are arranged on the arc R22, the keys ⌈h⌋, ⌈j⌋, ⌈k⌋ and ⌈l⌋ are arranged on the arc R23, the keys ⌈n⌋, ⌈m⌋, ⌈,⌋ and ⌈.⌋ are arranged on the arc R24, and the arcs R21-R24 are arranged in a second arcuate shape.

The keys arranged on the arcs L21-L25 and R21-R25 in the above-mentioned first key rows 190 and second key rows 290 may further extend to the left and right respectively. In this embodiment, only four keys are arranged on each arc, which is not limiting. In other embodiments, at least three keys on the right side of the left-hand keypad 100 are arranged on the arcs L21-L24, and at least three keys on the left side of the right-hand keypad 200 are arranged on the arcs R21-R24. At the same time, the radian of L21-L25 extending to the left may be different from the radian of the keys arranged as above, and the radian of R21-R25 extending to the right may be different from the radian of the keys arranged as above.

In addition, the ergonomic keyboard 10 provided by the utility model further comprises a plurality of edit keys 810, which are arranged between the left-hand keypad 100 and the right-hand keypad 200, such as ⌈Ctrl⌋, ⌈Shift⌋ and ⌈Enter⌋ or the space key. Further, two more space keys can be arranged at the positions, near the user proximal end 300, of the left-hand keypad 100 and the right-hand keypad 200 respectively according to the positions of the left-hand keypad 100 and the right-hand keypad 200, for use by the left hand or the right hand. In addition, function keys, edit keys 810, or shortcut keys may be arranged at the positions, near the user proximal end 300, of the first key column 110 and the second key column 210 to facilitate operation.

Further, the ergonomic keyboard 10 also comprises a numeric keypad 830 and a direction keypad 840, the direction keypad 840 is located to the right side of the right-hand keypad 200, and the numeric keypad 830 is located to the right side of the direction keypad 840.

Figure 5:
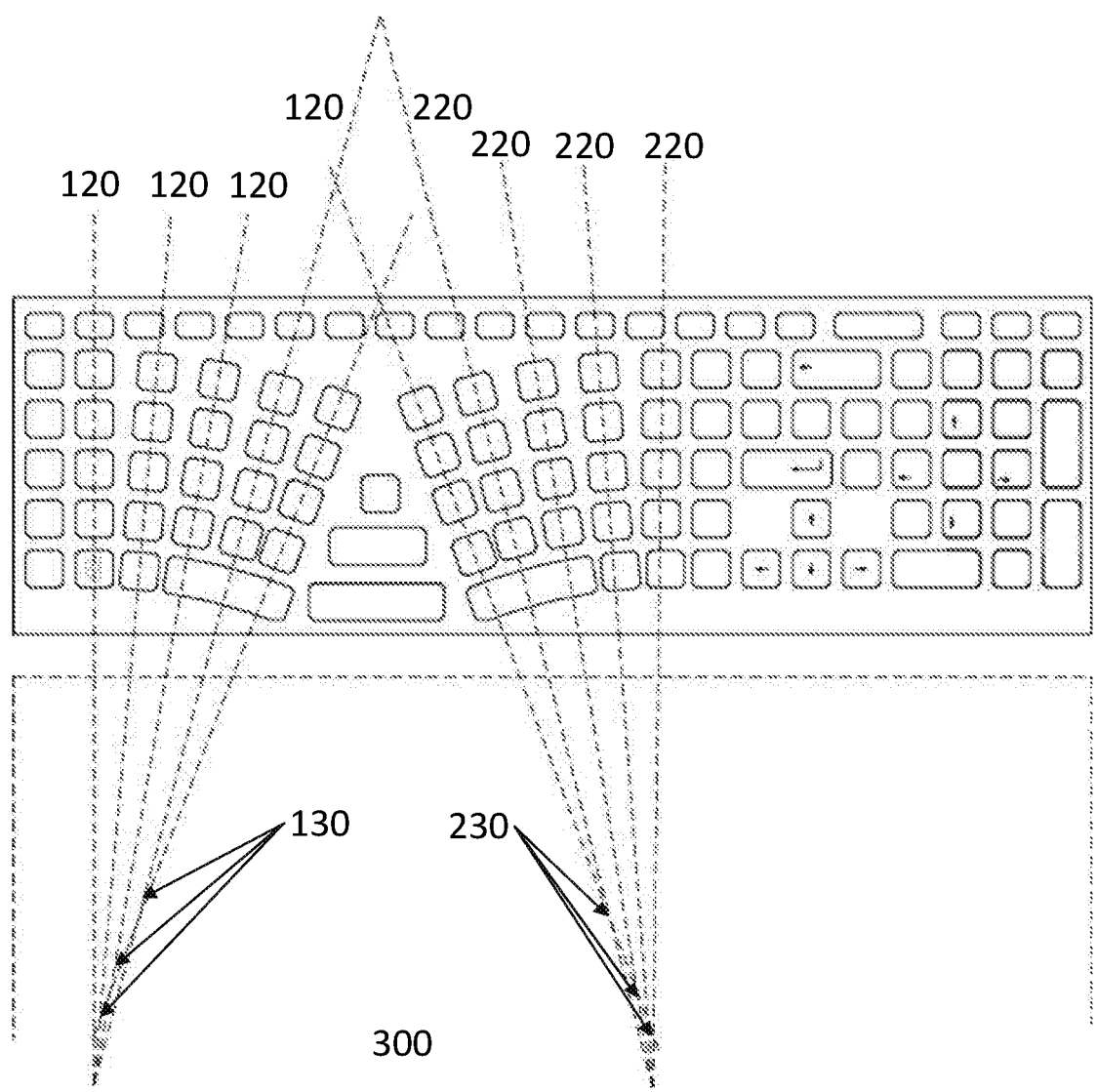
FIG. 5 is a schematic diagram of key arrangement of another ergonomic keyboard embodiment according to the utility model.

Referring to FIG. 5, in another embodiment, the plurality of first straight lines 120 may have a plurality of first intersection points 130 located at the user proximal end 300 of the ergonomic keyboard 10; and the plurality of second straight lines 220 have a plurality of second intersection points 230 located at the user proximal end 300 of the ergonomic keyboard 10. That is to say, the radians between every two first straight lines 120 are different, so that the plurality of first straight lines 120 meet at the plurality of first intersection points 130 respectively, and the radians between every two second straight lines 220 are different, so that the plurality of second straight lines 220 meet at the plurality of second meeting points 230 respectively.

Figure 6:
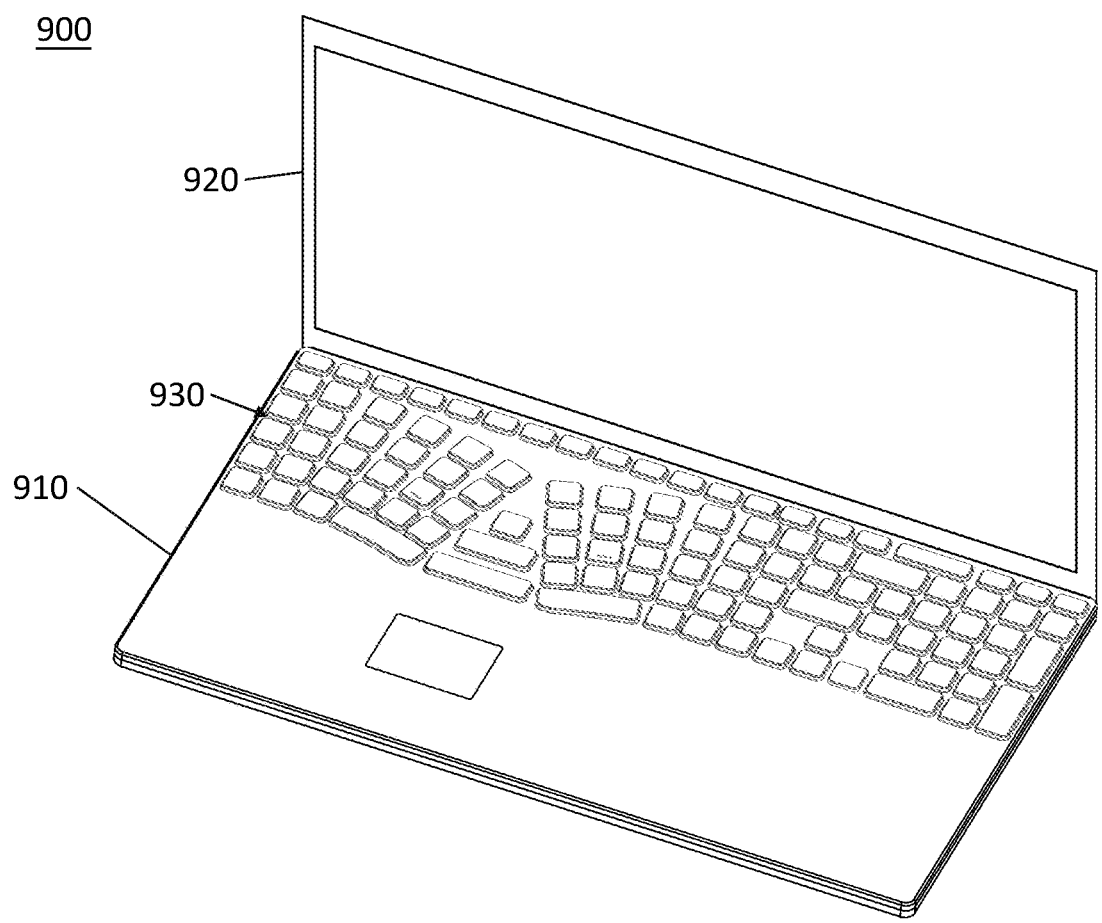
FIG. 6 is a structural diagram of a portable computer according to the utility model.

Referring to FIG. 6 which shows another embodiment of the utility model providing a portable computer 900, and the portable computer 900 comprises a host 910 and a display screen 920 pivoted to the host 910, wherein the host 910 further comprises a keyboard 930 with the technical features of the ergonomic keyboard 10 described above.

The utility model is characterized by rearranging the main commonly used keys in a manner conforming to the radial physiological structure and movement characteristics of human palm and phalanges, so as to enable the user to obtain an easy and comfortable operation experience.

Besides the QWERTY standard keyboard order, the arrangement order of letters and numbers of the main commonly used keys can also adopt other keyboard arrangement order standards.

The utility model has the beneficial effects of providing an ergonomic keyboard and a portable computer, wherein the key columns on the keyboard are arranged in a radial pattern and an included angle exists between every two key columns, conforming to the anatomical feature that natural angles exist between the phalanges of a human palm, so the problem of forced twisting of wrist joints, palm joints and interphalangeal joints during typing can be effectively solved, and the input speed and accuracy can be improved.

The above is only the preferred embodiment of the utility model and is not intended to limit the scope of rights of the utility model. Besides, the above description should be understood and implemented by those skilled in the relevant art, so other equivalent changes or modifications that do not depart from the spirit disclosed in the utility model should be included in the claims.

The invention claimed is:

1. An ergonomic keyboard 10 comprising a left-hand keypad 100, a right-hand keypad 200, a user proximal end 300 and a user distal end 400, wherein
    the left-hand keypad 100 comprises a plurality of first key columns 110 and a plurality of first key rows 190, the plurality of first key columns 110 are in a first radial arrangement,
    the right-hand keypad 200 comprises a plurality of second key columns 210 and a plurality of second key rows 290, and the plurality of second key columns 210 are in a second radial arrangement;
    the first radial arrangement is that there is a first included angle 140 between every two first straight lines 120 where the first key columns 110 are located, and the plurality of first straight lines 120 have at least one first intersection point 130 close to the user proximal end 300 of the ergonomic keyboard 10;

the second radial arrangement is that there is a second included angle 240 between every two second straight lines 220 where the second key columns 210 are located, and the plurality of second straight lines 220 have at least one second intersection point 230 close to the user proximal end 300 of the ergonomic keyboard 10; and each of the first included angles 140 is 2-8 degrees, and each of the second included angles 240 is 2-8 degrees.

2. The ergonomic keyboard 10 of claim 1, wherein the plurality of first straight lines 120 are provided with a plurality of first intersection points 130 located at the user proximal end 300 of the ergonomic keyboard 10, and the plurality of second straight lines 220 are provided with a plurality of second intersection points 230 located at the user proximal end 300 of the ergonomic keyboard 10.

3. The ergonomic keyboard 10 of claim 1, wherein a plurality of third included angles 410 and a plurality of third intersection points 420 are formed between the first straight lines 120 and the second straight lines 220, and the plurality of third intersection points 420 are located at the user distal end 400 of the ergonomic keyboard 10.

4. The ergonomic keyboard 10 of claim 3, wherein among the plurality of the third included angles 410, the minimum angle is 10 degrees and the maximum angle is 60 degrees.

5. The ergonomic keyboard 10 of claim 1, wherein at least one of the first key rows 190 is in a first arcuate shape arrangement, and the center of the first arcuate shape is located to the left side of the user proximal end 300, and at least one of the second key rows 290 is arranged in a second arcuate shape, and the center of the second arcuate shape is located to the right side of the user proximal end 300.

6. The ergonomic keyboard 10 of claim 1, further comprising a plurality of edit keys 810 arranged between the left-hand keypad 100 and the right-hand keypad 200.

7. The ergonomic keyboard 10 of claim 1, further comprising a numeric keypad 830 arranged to the right side of the right-hand keypad 200.

8. A portable computer 900 comprising a host 910 and a display screen 920 pivoted to the host 910, the host 910 further comprising an ergonomic keyboard 10, the ergonomic keyboard 10 comprising a left-hand keypad 100, a right-hand keypad 200, a user proximal end 300 and a user distal end 400, wherein the left-hand keypad 100 comprises a plurality of first key columns 110 and a plurality of first key rows 190, the plurality of first key columns 110 are in a first radial arrangement, the right-hand keypad 200 comprises a plurality of second key columns 210 and a plurality of second key rows 290, and the plurality of second key columns 210 are in a second radial arrangement;

the first radial arrangement is that there is a first included angle 140 between every two first straight lines 120 where the first key columns 110 are located, and the plurality of first straight lines 120 have at least one first intersection point 130 close to the user proximal end 300 of the ergonomic keyboard 10;

the second radial arrangement is that there is a second included angle 240 between every two second straight lines 220 where the second key columns 210 are located, and the plurality of second straight lines 220 have at least one second intersection point 230 close to the user proximal end 300 of the ergonomic keyboard 10; and each of the first included angles 140 is 2-8 degrees, and each of the second included angles 240 is 2-8 degrees.

9. The portable computer 900 of claim 8, wherein the plurality of first straight lines 120 are provided with a plurality of first intersection points 130 located at the user proximal end 300 of the ergonomic keyboard 10, and the plurality of second straight lines 220 are provided with a plurality of second intersection points 230 located at the user proximal end 300 of the ergonomic keyboard 10.

10. The portable computer 900 of claim 8, wherein a plurality of third included angles 410 and a plurality of third intersection points 420 are formed between the first straight lines 120 and the second straight lines 220, and the plurality of third intersection points 420 are located at the user distal end 400 of the ergonomic keyboard 10.

11. The portable computer 900 of claim 10, wherein among the plurality of the third included angles 410, the minimum angle is 10 degrees and the maximum angle is 60 degrees.

12. The portable computer 900 of claim 8, wherein at least one of the first key rows 190 is in a first arcuate shape arrangement, and the center of the first arcuate shape is located to the left side of the user proximal end 300, and at least one of the second key rows 290 is arranged in a second arcuate shape, and the center of the second arcuate shape is located to the right side of the user proximal end 300.

13. The portable computer 900 of claim 8, further comprising a plurality of edit keys 810 arranged between the left-hand keypad 100 and the right-hand keypad 200.

14. The portable computer 900 of claim 8, further comprising a numeric keypad 830 arranged to the right side of the right-hand keypad 200.

\* \* \* \* \*